US009013272B2

(12) United States Patent
Kaminska et al.

(10) Patent No.: US 9,013,272 B2
(45) Date of Patent: *Apr. 21, 2015

(54) SECURITY DOCUMENT WITH NANO-OPTICAL DISPLAY

(75) Inventors: Bozena Kaminska, Vancouver (CA); Clinton K. Landrock, North Vancouver (CA)

(73) Assignee: Simon Fraser University, Burnaby, BC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/265,871

(22) PCT Filed: Apr. 22, 2010

(86) PCT No.: PCT/CA2010/000577
§ 371 (c)(1),
(2), (4) Date: Oct. 23, 2011

(87) PCT Pub. No.: WO2010/121362
PCT Pub. Date: Oct. 28, 2010

(65) Prior Publication Data
US 2012/0038463 A1    Feb. 16, 2012

Related U.S. Application Data

(63) Continuation-in-part of application No. 12/386,789, filed on Apr. 22, 2009, now Pat. No. 8,253,536.

(51) Int. Cl.
*G06K 19/06* (2006.01)
*G06K 19/067* (2006.01)
*B42D 25/29* (2014.01)

(52) U.S. Cl.
CPC ............. *B42D 25/29* (2014.10); *Y10S 977/834* (2013.01)

(58) Field of Classification Search
USPC ...................... 235/379–382.5, 435, 444–448, 235/453–455, 488–491; 257/98; 283/67, 283/70, 72, 74, 81, 83, 87, 94, 107–109; 313/504–512; 340/5.8, 5.86, 10.1; 356/432–433, 445, 448; 382/135, 382/137–140, 162, 165, 209–214; 428/29, 428/500, 688–690, 913, 915–917; 977/834, 977/902, 952

See application file for complete search history.

(56) References Cited

U.S. PATENT DOCUMENTS 3,419,760 A    12/1968 Raleigh
4,728,591 A *  3/1988 Clark et al. ...................... 430/5
(Continued)

FOREIGN PATENT DOCUMENTS

CA    2337787    1/1999
CA    2369744    12/2000
(Continued)

OTHER PUBLICATIONS

J Brufau-Penella et al., "Characterization of the harvesting apabilities of an ionic polymer metal composite device", Nov. 27, 2007, Smart Materials and Structures, IOP Publishing (UK).*
(Continued)

*Primary Examiner* — Benjamin C Lee
*Assistant Examiner* — Stephen Burgdorf
(74) *Attorney, Agent, or Firm* — Palmer IP

(57) ABSTRACT

A security document is disclosed which includes an electrical circuit embedded in a document substrate, where the electrical circuit includes a power source with at least one electroactive polymer power generator, and an optical display including at least one electroluminescent display element and at least one nanohole array which forms a layer of the electroluminescent display element. Security features comprising nanohole arrays are also provided. A method of authenticating a security document is disclosed, including illuminating an encoded nanohole array in the security document with a focused light beam or laser light source emitting at least one defined wavelength of incident light, detecting a transmitted portion of the incident light transmitted through the nanohole array with an optoelectronic sensor, analyzing at least one wavelength of the transmitted portion of light to produce a detected signal, and comparing the detected signal with an authentication signal to authenticate the security document.

22 Claims, 6 Drawing Sheets

(56) References Cited

U.S. PATENT DOCUMENTS

| | | | |
|---|---|---|---|
| 5,566,982 A | 10/1996 | Lehureau et al. | |
| 6,586,859 B2* | 7/2003 | Kornbluh et al. | 310/309 |
| 6,882,100 B2 | 4/2005 | Chen et al. | |
| 6,946,674 B2* | 9/2005 | Nagao | 257/13 |
| 7,265,375 B2* | 9/2007 | Zhang et al. | 257/15 |
| 7,301,682 B1 | 11/2007 | Puttkammer | |
| 7,347,917 B2 | 3/2008 | Ash et al. | |
| 7,351,588 B2 | 4/2008 | Poponin | |
| 7,682,523 B2* | 3/2010 | Weisman et al. | 252/301.36 |
| 7,696,687 B2* | 4/2010 | Lee et al. | 313/506 |
| 7,982,375 B2 | 7/2011 | Tan et al. | |
| 8,530,863 B2* | 9/2013 | Lawandy | 250/486.1 |
| 8,537,457 B1* | 9/2013 | Ptasinski et al. | 359/321 |
| 2004/0025639 A1* | 2/2004 | Shahinpoor et al. | 75/722 |
| 2005/0113892 A1* | 5/2005 | Sproul | 607/100 |
| 2005/0161589 A1* | 7/2005 | Kim et al. | 250/216 |
| 2005/0179026 A1 | 8/2005 | Myers et al. | |
| 2005/0208554 A1* | 9/2005 | Chan et al. | 435/6 |
| 2006/0055933 A1 | 3/2006 | Mukai | |
| 2006/0196945 A1* | 9/2006 | Mendels | 235/470 |
| 2006/0202125 A1* | 9/2006 | Suhami | 250/368 |
| 2006/0240543 A1 | 10/2006 | Folch et al. | |
| 2007/0223940 A1 | 9/2007 | Smolyaninov et al. | |
| 2007/0229817 A1* | 10/2007 | Wang et al. | 356/301 |
| 2007/0263285 A1* | 11/2007 | Walter et al. | 359/566 |
| 2008/0024866 A1* | 1/2008 | Walter et al. | 359/569 |
| 2008/0035736 A1 | 2/2008 | Tompkin et al. | |
| 2008/0107906 A1* | 5/2008 | Choi et al. | 428/422 |
| 2008/0117362 A1* | 5/2008 | Wolk et al. | 349/69 |
| 2008/0171192 A1* | 7/2008 | Gadomsky | 428/323 |
| 2008/0212102 A1* | 9/2008 | Nuzzo et al. | 356/445 |
| 2008/0278728 A1 | 11/2008 | Tetz et al. | |
| 2009/0034055 A1* | 2/2009 | Gibson | 359/296 |
| 2009/0050878 A1* | 2/2009 | Okada et al. | 257/40 |
| 2009/0321620 A1* | 12/2009 | Hillis et al. | 250/227.23 |
| 2010/0084850 A1 | 4/2010 | Jackson et al. | |
| 2010/0109595 A1* | 5/2010 | Tan et al. | 318/652 |
| 2010/0118378 A1* | 5/2010 | Robertsson et al. | 359/267 |
| 2010/0127287 A1* | 5/2010 | Mao et al. | 257/98 |
| 2010/0148050 A1* | 6/2010 | Bari | 250/271 |
| 2010/0195916 A1* | 8/2010 | Blondiaux et al. | 382/209 |
| 2010/0198305 A1* | 8/2010 | Farbarik | 607/60 |
| 2010/0224236 A1 | 9/2010 | Reilly, III et al. | |
| 2010/0271174 A1 | 10/2010 | Kaminska et al. | |
| 2010/0277441 A1* | 11/2010 | Stahl et al. | 345/204 |
| 2012/0021954 A1* | 1/2012 | Gazit et al. | 506/18 |
| 2012/0061471 A1* | 3/2012 | Scheuer | 235/494 |

FOREIGN PATENT DOCUMENTS

| | | |
|---|---|---|
| EP | 1431062 | 6/2004 |
| EP | 1736323 | 12/2006 |
| EP | 1813440 | 8/2007 |
| WO | WO 2004/056583 | 7/2004 |
| WO | WO 2008/040056 | 4/2008 |
| WO | WO 2008/135502 | 11/2008 |
| WO | WO 2010/121362 | 10/2010 |

OTHER PUBLICATIONS

Kyung-Won Park et al.; All-solid-state supercapacitor using a Nafion polymer membrane and its hybridization with a direct methonal fuel cell; 2002; Journal of Power Sources 109 (2002) 500-506; Elsevier Science B.V.*

Committee on Technologies to Deter Currency Counterfeiting, National Research Council; "A Pathe to the Next Generation of U.S. Banknotes—Keeping them Real"; 2007; National Academies Press.*

Bar-Cohen Y, Bao X, Sherrit S, Shyh-Shiuh Lin, Characterization of the Electromechanical Properties of Ionomeric Polymer-Metal Composite (IPMC), 8 pages, Paper 4695-33, Proceedings of the SPIE Smart Structures and Materials Symposium, EAPAD Conference, San Diego, CA, Mar. 18-21, 2002.

Holger Becker, Claudia Gärtner, Polymer microfabrication technologies for microfluidic systems, Anal Bioanal Chem, 2007, Springer-Verlag.

R. Gordon, M. Huges, Leathem B., K. L. Kavanagh, A. G. Brolo, Basis and Lattice Polarization Mechanisms for Light Transmission through Nanohole Arrays in a Metal Film, 2005, NANO Letters, vol. 5, No. 7 1243-1246, American Chemical Society.

Reuven Gordon, David Sinton, Karen L. Kavanagh, Alexandre G. Brolo, A New Generation of Sensors Based on Extraordinary Optical Transmission, Jun. 21, 2008, Accounts of Chemical research, American Chemical Society.

J Brufau-Penella, M Puig-Vidal, P Giannone, S Graziani, S Strazzeri, Characterization of the harvesting capabilities of an ionic polymer metal composite device, Nov. 27, 2007, Smart Materials and Structures 17 (2008) 015009 (15 pp.), IOP Publishing Ltd.

F. Carpi, D. De Rossi, Colours from electroactive polymers: Electrochromic, electroluminescent and laser devices based on organic materials, Optics & Laser Technology 38 (2006) 292-305, 2005 Elsevier Ltd.

John W. Franklin, Electromechanical Modeling of Encapsulated Ionic Polymer Transducers, Master of Science Thesis in Mechanical Engineering, 109 pages, Virginia Polytechnic Institute and State University, 2003.

C. Genet, T. W. Ebbesen, Light in tiny holes, Nature, vol. 445, Jan. 4, 2007, Nature Publishing Group.

Bruce Hardwick, Wayne Jackson, Gerard Wilson, Albert W. H. Mau, Advanced Materials for Banknote Applications, Advanced Materials 2001, 13, No. 12-13, Jul. 4, WILEY-VCH Verlag GmbH.

Claudia N. Hoth, Pavel Schilinsky, Stelios A. Choulis, Christoph J. Brabec, Printing Highly Efficient Organic Solar Cells, NANO Letters, 2008, vol. 8, No. 9 2806-2813, American Chemical Society.

Liyu Liu, Suili Peng, Weijia Wen, Ping Sheng, Paper-like thermochromic display, Applied Physics Letters 90, 213508 (2007), American Institute of Physics.

Troy A.E. Loss, Cerrie W. Rogers, Michael O. Wolf, Composite poly(p-phenylenevinylene)—Nafion thin films, Can. J. Chem. 76: 1554-1558 (1998), NRC Canada.

Franco Moia, New Colour Shifting Devices, Optical Security and Counterfeit Deterrence Techniques V, SPIE and IS&T/vol. 5310, SPIE and IS&T.

Kenneth M. Newbury, Donald J. Leo, Electromechanical Modeling and Characterization of Ionic Polymer Benders, Journal of Intelligent Material Systems and Structures, vol. 13—Jan. 2002, SAGE Publications.

Kyung-Won Park, Hyo-Jin Ahn, Yung-Eun Sung, All-solid-state supercapacitor using a Nafion® polymer membrane and its hybridization with a direct methanol fuel cell, Journal of Power Sources 109 (2002) 500-506, 7 pages, Elsevier Science B.V.

John A. Rogers, Zhenan Bao, Kirk Baldwin, Ananth Dodabalapur, Brian Crone, V. R. Raju, Valerie Kuck, Howard Katz, Karl Amundson, Jay Ewing, Paul Drzaic, Paper-like electronic displays: Large-area rubber-stamped plastic sheets of electronics and microencapsulated electrophoretic inks, PNAS, Apr. 24, 2001, vol. 98, No. 9, 4835-4840.

Kwang J. Kim, Mohsen Shahinpoor, A novel method of manufacturing three-dimensional ionic polymer-metal composites (IPMCs) biomimetic sensors, actuators and artificial muscles, Polymer 43 (2002) 797-802, Elsevier Science Ltd.

Kwang J Kim, Mohsen Shahinpoor, Ionic polymer-metal composites: II. Manufacturing techniques, Smart Materials and Structures 12 (2003) 65-79, IOP Publishing Ltd.

Qingjiang Sun, Yongfang Li, Qibing Pei, Polymer Light-Emitting Electrochemical Cells for High-Efficiency Low-Voltage Electroluminescent Devices, Journal of Display Technology, vol. 3, No. 2, Jun. 2007, IEEE.

Jao Van De Lagemaat, Teresa M. Barnes, Garry Rumbles, Sean E. Shaheen, Timothy J. Coutts, Chris Weeks, Igor Levitsky, Jorma Peltola, Paul Glatkowski, Organic solar cells with carbon nanotubes replacing In2O3:Sn as the transparent electrode, Applied Physics Letters 88, 233503, (2006), American Institute of Physics.

(56) References Cited

OTHER PUBLICATIONS

Feifei Wang, Yanmin Jia, Jun Wu, Xiangyong Zhao, Haosu Luo, Piezoelectric/electroluminescent composites for low voltage input flat-panel display devices, Applied Physics A 90, 729-731 (2008), Springer-Verlag.

Alexandre G. Brolo, Shing C. Kwok, Matthew G. Moffitt, Reuven Gordon, Jason Riordon, Karen L. Kavanagh., Enhanced Fluorescence from Arrays of Nanoholes in a Gold Film, J. Am. Chem. Soc. 2005, 127, 14936-14941, American Chemical Society.

Erik Ahlswede, Wolfgang Mühleisen, Mohd Wahinuddin Bin Moh Wahi, Jonas Hanisch, Michael Powalla, Highly efficient organic solar cells with printable low-cost transparent contacts, Applied Physics Letters 92, 143307 (2008), American Institute of Physics.

Il-Seok Park, Sang-Mun Kim, Kwang J Kim, Mechanical and thermal behavior of ionic polymer—metal composites: effects of electroded metals, Smart Materials and Structures 16 (2007) 1090-1097, IOP Publishing.

C Bonomo, L Fortuna, P Giannone, S Graziani and S Strazzeri, A model for ionic polymer metal composites as sensors, Smart Materials and Structures 15 (2006) 749-758, IOP Publishing.

Brufau-Penella, M. Puig-Vidal, P. Giannone and S. Strazzeri, Characterization of the harvesting capabilities of an ionic polymer metal composite device by J. , IOP Publishing, Smart Materials and Structures, 2008/ UK ("Penella").

\* cited by examiner

SECURITY DOCUMENT WITH NANO-OPTICAL DISPLAY

1. TECHNICAL FIELD

The present invention relates generally to security documents comprising authentication or verification features. More particularly, the present invention relates to a security device comprising an electrical circuit and/or nano-optics embedded in a substrate, where the electrical circuit provides authentication features for authenticating the security document.

2. BACKGROUND OF THE INVENTION

The use of security documents which must be able to be authenticated to confirm their value has become increasingly common as a part of daily life in modern society. For example, banknotes and other currency security documents such as traveler's cheques and bonds for example are used on a daily basis by billions of people, and must be able to be authenticated by users in order to avoid losses due to fraud and counterfeiting. Identity security documents such as passports, driver's licenses and identity cards for example are in widespread use and must be able to be accurately authenticated to verify the identity of the individual presenting the document. Similarly, other valuable security documents such as credit cards, cheques and share certificates for example are exchanged in everyday commerce and must be able to be authenticated in order to detect and avoid fraud. Accordingly, security features have been developed to be used in connection with security documents for the purpose of enabling the authentication of the document by users, as well as by law enforcement and government authorities.

One type of security feature known for use in security documents to make their copying more difficult, and the detection of copies more likely include passive physical features which are incorporated into the security document itself and visible to an unaided user. Such features include watermarks, embossings, metallic threads, holograms, metalized foils and other similar distinct and visible features which have been commonly implemented in banknotes, passports and cheques, for example. Unfortunately the development of advanced and inexpensive printing and copying technologies has made it possible for forgers to easily and convincingly reproduce many of these conventional visual authentication features, which have led to the failure of such known features to assure authenticity of security documents.

A further type of known authentication features incorporated in security documents includes magnetically, optically and/or radio frequency readable information encoded on the security document for detection and reading with an external device. Such features include magnetically readable strips on passports and credit cards, optically readable features such as microprinting or UV-fluorescing inks, and RFID transmitters, which may all be read or authenticated only with the use of an external reading and/or authentication device. Unfortunately, technological advances have also made such encoded security features relatively easy for forgers to copy, such as by duplicating magnetic card strips, and inexpensive high resolution microprinters, for example, leading to increased frequency of serious fraud and counterfeiting of security documents relying on such known encoded or machine-readable security features. Additionally, reliance on such known encoded or machine-readable security features that require an external device for authentication prevents an unaided user from being able to determine whether a security document is authentic or not.

Accordingly, there is still a need to develop alternative designs and features for security documents that enable their authentication by multiple types of users and for multiple types of uses, and that are not able to be easily or inexpensively reproduced by forgers or counterfeiters.

3. SUMMARY OF THE INVENTION

It is an object of the present invention to provide a security document that addresses some of the limitations of the prior art.

Another object of the present invention is to provide a method for authentication of a security document that addresses some of the limitations of the prior art.

It is a further object of the invention to provide a security document that addresses some of the limitations of the prior art and that can be authenticated in multiple ways or modes, including a security document that can be self authenticated by a user without the aid of additional or external authentication equipment.

According to an embodiment of the present invention, a security document comprising an electrical circuit embedded in a document substrate means is provided, wherein the electrical circuit comprises a power source comprising at least one electroactive polymer power generating means and an optical display comprising at least one electroluminescent display element and at least one nanohole array disposed as a layer of the electroluminescent display element.

According to another embodiment of the invention, a security document comprising an electrical circuit embedded in a document substrate means is provided, wherein the electrical circuit comprises at least one of a power storage means and a power generation means comprising at least one electroactive polymer capacitor means, and an optical display. The optical display comprises at least one electroluminescent display element comprising at least one nanohole array disposed as a layer of said electroluminescent display element.

According to yet another embodiment of the invention, a method of authenticating a security document comprising an electrical circuit embedded in a document substrate means, the electrical circuit comprising at least one electroactive polymer power generating means and an optical display comprising at least one electroluminescent display element and at least one encoded nanohole array disposed on the surface of the electroluminescent display element is provided, the method comprising:
  illuminating said encoded nanohole array with a focused light beam or laser light source emitting at least one defined wavelength of incident light;
  detecting a transmitted portion of said incident light transmitted through said nanohole array with an optoelectronic sensor;
  analyzing at least one wavelength of said transmitted portion of light detected by said sensor to produce a detected signal; and
  comparing said detected signal with an authentication signal to authenticate the security document.

According to a further embodiment of the invention, a security document is provided comprising at least one security thread which comprises one or more nano-features adapted as an optical display comprising at least one patterned area of nano-features in the security thread which are adapted to produce at least one optical effect.

Further advantages of the invention will become apparent when considering the drawings in conjunction with the detailed description.

4. BRIEF DESCRIPTION OF THE DRAWINGS

The security document of the present invention will now be described with reference to the accompanying drawing figures, in which.

Like reference numerals refer to corresponding parts throughout the several views of the drawings.

5. DETAILED DESCRIPTION OF THE INVENTION

According to one embodiment, the present invention provides for security documents which comprise an electrical circuit within the security document, and which comprise authentication features that provide for the authentication of the security document in multiple modes. One such mode of authentication may preferably comprise self-authentication of the security document without use of external authentication devices such as by the unaided eye of an end-use. Other authentication modes may preferably comprise one or more authentication modes incorporating the use of optical, electronic, and/or optoelectronic authentication devices to confirm the authenticity of the security document such as authentication by transactional or verification machines, or by specialist and/or security personnel. The security document of the present invention may in theory be applied to any type of security document where there is a desire to be able to authenticate the security document in use. For example and without limitation, the security document may be applied as banknotes, identification documents, passports, certificates, financial documents, authentication certificates, credit cards or other value papers. In other exemplary embodiments, the security document may be applied as product identification or authentification documents such as drug identification or drug release documents or devices, or product seals or certificates of authenticity, for example. In particular, the security document may be applied in applications where a thin, flexible security document which may be easily authenticated in one or more ways is needed.

Figure 1:
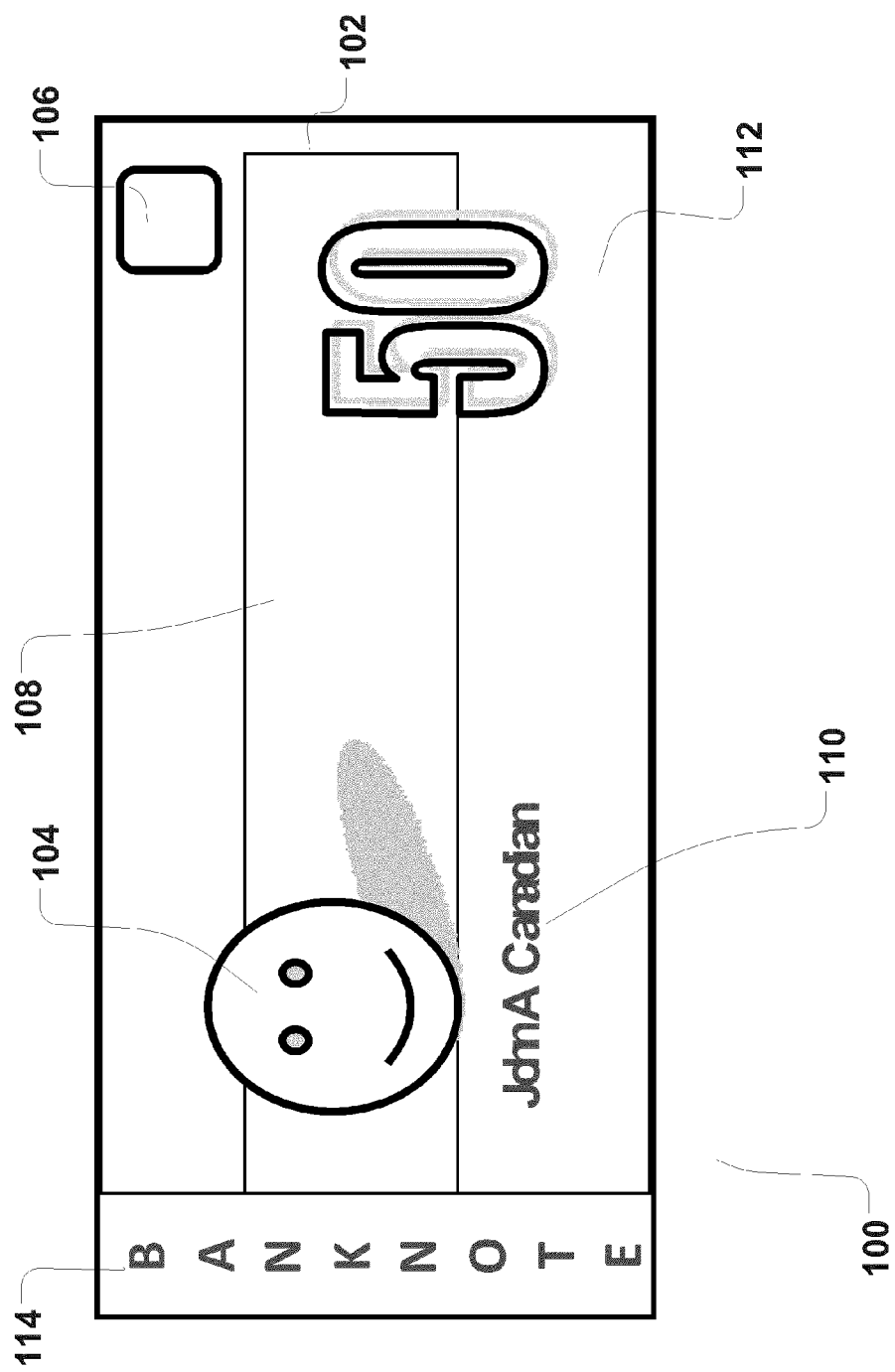
FIG. 1 illustrates a top view of an exemplary security document according to an embodiment of the present invention.

The present invention will now be further described with reference to the Figures. FIG. 1 illustrates a top view of an exemplary security document 100 according to an embodiment of the present invention. The security document 100 is preferably provided in the form of a thin flexible sheet, such as may be used in common security documents such as banknotes, passports, certificates, identification documents, financial documents, authentication certificates, and other value papers, for example. The security document 100 comprises a document substrate 112 forming the backbone of the security document 100, and in which other components of the security document may be embedded and/or on which other components may be attached or printed, for example. The substrate 112 may be formed of any suitable substrate material which can be made into a thin sheet form to form a security document, such as cellulose and/or polymer based materials, for example. In particular, polymer based substrate materials including but not limited to polypropylene, polyethylene, PET, PDMS, and PMMA materials may be used to form substrate 112. In a particular embodiment for use as a banknote, the security document 100 and substrate 112 may preferably comprise a thin sheet less than about 400 μm thick, and more preferably between about 100 μm to 200 μm thick. However, for other applications, the security document 100 and substrate 112 may comprise any suitable thickness while preferably allowing for flexibility of the security document as may be desired for use in such applications.

The security document 100 may also comprise an electrical circuit embedded within or attached to substrate 112, formed by electrically connected electroactive polymer and optical display security document elements. Such electrically connected security document elements include an electroactive polymer power source, shown as exemplary electroactive polymer strip 102, and an optical display element 104, such as exemplary electroluminescent display element 104 as illustrated in FIG. 1. The electroactive polymer strip 102 may preferably comprise a layered ionic polymer metal composite (IPMC) material and may be configured to generate electrical power upon mechanical deformation of electroactive polymer strip 102, or to store electrical energy as an electroactive polymer capacitor 102, or both. Alternatively, a first portion of electroactive polymer strip 102 may be provided to generate electrical power upon mechanical deformation of the strip, and in some embodiments a second electroactive polymer element or portion 108 of strip 102 may also be provided to store electrical power as an electroactive polymer capacitor 108. The electroactive polymer strip 102 may be configured in a number of ways, and may be provided in a number of geometries depending upon the configuration and use of the security document 100. For example strip 102 may be a regular or irregular shape, and may be of substantially any size relative to the substrate 112 and security document 100, including a strip having a width corresponding to only a portion of the width and/or length of the security document, or alternatively as a strip extending substantially the full width and/or length of the substrate 112 or security document 100. In general, however, the electroactive polymer strip 102 may be provided as a regular shape such as a rectangular strip 102. The thickness of electroactive polymer strip 102 may vary depending upon the desired physical and electrical properties of the security document, but may typically be chosen such that the thickness is less than that desired for the security document 100 and substrate 112, and such that the desired flexibility of the security document 100 is maintained, while being thick enough to provide the desired electrical power generation and/or storage capacity. Accordingly, for use in banknote security documents, for example, the thickness of the electroactive polymer strip 102 may preferably be between about 50 μm and 200 μm thick.

Optical display element 104 may comprise a suitable electroluminescent source, such as known electroluminescent display technologies, and further comprises at least one nanohole array integrated as at least one layer of the optical display element 104. Suitable electroluminescent display technologies may include electrofluorescent dye displays, electroluminescent dye displays, light emitting diode displays, and organic light emitting diode displays, for example. A suitable electroluminescent display may be selected according to the desired optical properties of the optical display element 104, and to the desired properties and intended use of the security document 100. For example, in applications where the security document 100 is a banknote, a thin and flexible electroluminescent display such as an organic light emitting diode (OLED) display may be preferably selected, wherein the OLED display is preferably less than about 100 μm thick, requires little power to illuminate, and is flexible and not damaged by bending or folding of the security document 100. The optical element 104 also comprises at least one nanohole array integrated as at least one layer of the optical display element 104. The at least one nanohole array may be integrated into the optical display element 104 as one or more of an aperture, filter and preferably transparent surface electrode of the optical display element 104. In a preferred embodiment, the nanohole array comprises a metal film comprising a series of nanoholes or nano-features of sub-wavelength dimension relative to the light emitted or transmitted by the optical display element 104, and the nanohole array is further operable to alter the intensity of the light waves emitted and/or transmitted by the optical display element 104. In one embodiment, the nanohole array may comprise sub-wavelength dimensioned nanoholes or nano-features which comprise substantially circular holes, or alternately holes or openings of other geometric shapes such as rectangular, triangular, polyhedral, elliptical, ovoid, or irregular or wavy holes or openings, for example. In another embodiment, the nanohole array may comprise nanoholes or nano-features of sub-wavelength dimension which comprise substantially elongated openings, such as lines, slits, arced, or curved openings, for example, and which may optionally be oriented substantially parallel to each other to provide a nano-feature grating, for example. In yet another embodiment, the nanohole array may comprise nano-features of sub-wavelength dimension in the metal film or substrate, such as cantilevers, grooves, bumps, bosses, indents, waves, or shapes in the form of letters, numerals, or symbols, for example, for which there may optionally be no opening extending through the metal film or substrate.

In an alternative embodiment, the optical display element 104 may comprise one or more nanohole arrays comprising nanoholes and/or nano-features alone, such as nanoholes or nano-features of sub-wavelength dimension which are arranged in one or more patterns to provide an optical effect, for example. In one such embodiment, patterns may comprise regular, irregular, periodic, non-periodic and/or random patterns of nanoholes and/or nano-features, for example. In another such embodiment, the optical effect may comprise features such as color shifting effects as a viewer's perspective moves across the nanohole array, such as from one color shifting to another color or colors, or may comprise precise individual points of light of one or more defined colors such as in a recognizable pattern or image, for example.

Electroactive polymer element 102 and optical display element 104 may be electrically connected to form an electrical circuit within security document 100 by any suitable electrical connection means. Exemplary such electrical connection means may comprise one or more electrically conductive polymer layers embedded within or attached to security document 100, such as embedded within or attached to substrate 112, for example. Alternatively, other suitable electrical connection means may comprise one or more electrically conductive thin foil layers, printed and/or etched electrically conductive films or ribbons, and/or other known electrical connection means. Preferably suitable such electrical connection means may be selected based on the desired physical and electrical properties of the security document 100, and may therefore desirably be significantly thinner than the thickness of the security document 100, and also desirably flexible and durable for use in a security document in the typical form of a thin flexible sheet. The security document 100 may also optionally comprise other electrical circuit components (not shown) that may be incorporated into the electrical circuit within security document 100. Such optional additional electrical circuit components may comprise resistors, capacitors, diodes, transistors, switches and the like that may be configured as part of the electrical circuit within security document 100. Accordingly, such optional additional electrical circuit components may preferably be suitably thin, flexible and durable for use in the desired security document application.

Security document 100 may comprise additional elements to desirably provide and/or enhance authentication features of the security document 100. In one embodiment, the security document 100 may also comprise a photovoltaic power source 106. The photovoltaic power source 106 may comprise at least one photovoltaic cell and may be electrically connected to the electrical circuit within the security document 100, such as to electroactive polymer element 102 and/or to optical display element 104, for example. The photovoltaic power source 106 may be functional therefore to convert photonic energy from a light source incident on the photovoltaic cell(s) of the power source 106 into electrical energy. Such electrical energy generated by the photovoltaic power source 106 may then be used to illuminate the optical display element 104, and/or may be stored in the electroactive polymer element 102, for example. In a particular embodiment, the photovoltaic power source 106 may also desirably comprise at least one nanohole array integrated as a layer of the photovoltaic cell(s) comprised in power source 106. Such integrated nanohole array(s) may preferably be integrated as at least one or more of an aperture, a filter and a transparent surface electrode of the photovoltaic cell(s), so as to increase the intensity of light reaching the photovoltaic cell(s) relative to the external light incident on the photovoltaic power source 106, and thereby increase the efficiency of the photovoltaic power source 106. In one embodiment, such a nanohole array integrated into the photovoltaic cell or power source 106 may comprise sub-wavelength dimensioned nanoholes or nano-features which comprise substantially circular holes, or alternately holes or openings of other geometric shapes such as rectangular, triangular, polyhedral, elliptical, ovoid, or irregular or wavy holes or openings, for example. In another embodiment, the nanohole array may comprise nanoholes or nano-features of sub-wavelength dimension which comprise substantially elongated openings, such as lines, slits, arced, or curved openings, for example, and which may optionally be oriented substantially parallel to each other to provide a nano-feature grating, for example. In a particular embodiment, multiple of substantially parallel nano-slits of sub-wavelength dimension or width may be formed in or integrated into a layer of the photovoltaic cell power source 106 as a nano-grating, for example. In yet another embodiment, the nanohole array may comprise nano-features of sub-wavelength dimension in a metal film, polymer film or other substrate material forming part of or integrated into photovoltaic power source 106, such as cantilevers, grooves, bumps, bosses, indents, waves, or shapes in the form of letters, numerals, or symbols, for example, for which there may optionally be no opening extending through the metal or polymer film or substrate layer.

In another embodiment, the security document 100 may also comprise a nanoscale authentication feature or security thread 110. A nanoscale security thread 110 may comprise at least one nanohole array embedded in the security document 100 such as in the document substrate 112, that comprises one or more, and preferably a series of nanoholes or nano-features of sub-wavelength dimension relative to at least one wavelength of an incident light source, which are arranged in a distinct pattern so as to affect the transmission of incident light through the nanohole array. Similar to as described above, in one embodiment the at least one nanohole array may comprise substantially circular nanoholes, or alternately holes or openings of other geometric shapes such as rectangular, triangular, polyhedral, elliptical, ovoid, or irregular or wavy holes or openings, for example. In another embodiment, the nanohole array may comprise nanoholes or nano-features of sub-wavelength dimension which comprise substantially elongated openings, such as lines, slits, arced, or curved openings, for example, and which may optionally be oriented substantially parallel to each other to provide a nano-feature grating, for example.

In one embodiment of the present invention, the nanoscale security thread 110 may comprise a nanohole array that is preferably readable by illumination with an external light source, to produce a distinct light pattern which may be detected and verified by an optoelectronic sensor to authenticate the security document 100. In another aspect, the nanoscale security thread 110 may comprise a nanohole array with nanoholes or nano-features arranged in a pattern that is visible and distinct when viewed under a high-powered microscope, such as a scanning electron microscope, for example. In such an aspect, the nanohole array may comprise nanoholes or nano-features arranged in a pattern to form a recognizable picture or "nano-art" which may be identified by viewing under a high-powered microscope, to authenticate the security document 100.

In yet another embodiment, the security document 100 may also comprise one or more additional conventional security features 114 to further increase the security of the document 100 in combination with the above-described authentication features. Such conventional security features 114 may comprise one or more of security threads, microprinting, holograms, optically variable effects and embossed and/or metalized foils, for example. Such additional conventional security features 114 may be authenticated by known means such as by visual inspection by an unaided user, and/or under optical magnification, for example.

In a further embodiment according to the invention, exemplary conventional security features 114 such as but not limited to security threads, microprinting, holograms, optically variable effects and embossed and/or metalized foils may optionally also be provided with one or more nanohole arrays or may comprise one or more nanohole optical display elements comprising nanohole arrays integrated into the conventional security feature 114. For example, a security thread according to an aspect of the invention may be provided which incorporates at least one nanohole array, which may comprise substantially circular nanoholes, or alternately holes or openings of other geometric shapes such as rectangular, triangular, polyhedral, elliptical, ovoid, or irregular or wavy holes or openings, or combinations thereof, for example. In another embodiment, the nanohole array may comprise nanoholes or nano-features of sub-wavelength dimension which comprise substantially elongated openings, such as lines, slits, arced, or curved openings, for example, and which may optionally be oriented substantially parallel to each other to provide a nano-feature grating, for example. In yet another embodiment, the nanohole array may comprise nano-features of sub-wavelength dimension in a metal film or other security thread substrate, such as cantilevers, grooves, bumps, bosses, indents, waves, or shapes in the form of letters, numerals, or symbols, for example, for which there may optionally be no opening extending through the metal film or security thread substrate. In one such embodiment, nanoholes or nano-features of sub-wavelength dimension may be arranged in one or more patterns to provide an optical effect, such as arrangement in patterns which may comprise regular, irregular, periodic, non-periodic and/or random patterns of nanoholes and/or nano-features. In other embodiments according to the invention, other types of conventional security features 114 may comprise one or more nanohole arrays, similar to as described above, integrated into the conventional security feature, such as to provide a distinct and identifiable optical effect to increase security and reduce ease of counterfeit, for example.

According to an embodiment of the invention, the security document 100 illustrated in FIG. 1 comprising an embedded electrical circuit with electroactive polymer 102 and optical display 104 elements may desirably be authenticated by a user in one or more ways or modes. A first authentication mode may desirably comprise generating electrical power by mechanically deforming electroactive polymer strip 102, which electrical power is conducted to optical display element 104 by the electrical circuit, and acts to illuminate the optical display element 104 which may be visible by an unaided viewer, and may preferably provide a distinctive illumination pattern such as may be created using a nanohole array integrated into the optical display element 104 to alter the display illumination. A user of the security document may use this first authentication mode by physically bending and/or pressing the security document 100 to cause the optical display element 104 to illuminate, thereby authenticating the security document. Such first authentication mode may be described as self-authentication since the security document 100 may be authenticated by a user without the use of external equipment or apparatus.

A second authentication mode may desirably comprise the use of an external source of illumination to illuminate and/or transmit a particular type of light source such as a focused beam or laser light source through a nanohole array authentication feature for detection using an optoelectronic sensor, for example. The detected light beam may then be verified based on alteration of the detected light beam by the nanohole array, in order to authenticate the security document 100. Such second authentication mode may be used for authentication of the security document 100 by automated transactional and/or verification machines for example.

A third authentication mode may desirably comprise the use of a desirably sophisticated, expensive and/or otherwise restricted microscope or imaging device such as a scanning electron microscope to inspect the pattern of nanoholes in one or more nanohole arrays embedded in or on the security document 100. Such third authentication mode may be used for authenticating the security document 100 by inspection of nano-art and/or other nanohole array patterns incorporated in the security document 100 by authorized government, security and/or law enforcement personnel, for example. Accordingly, the security document 100 according to the embodiments of the present invention desirably comprise authentication features that provide for authentication of the document by one or more modes of authentication.

Figure 2:
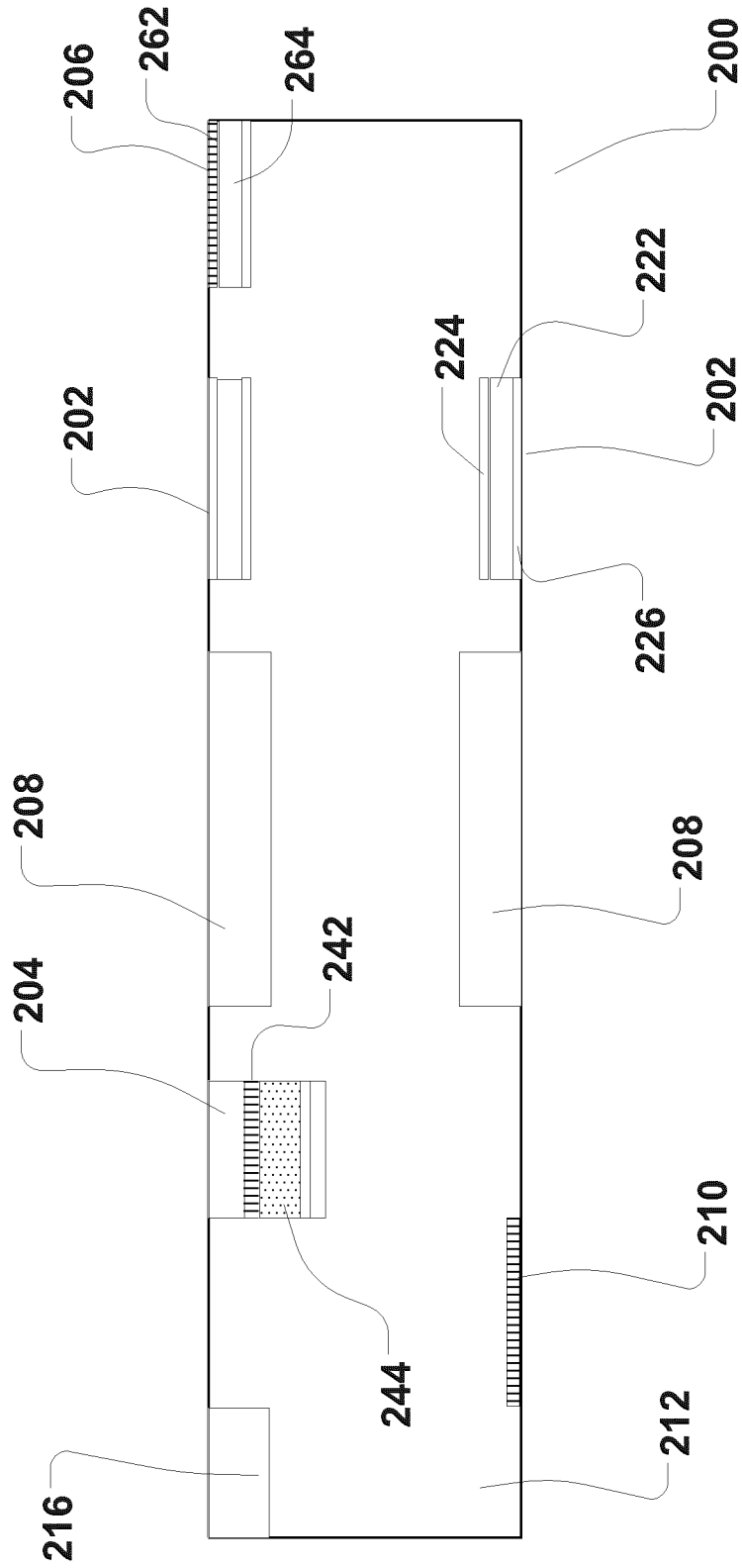
FIG. 2 illustrates a cross sectional schematic view of an exemplary security document according to an embodiment of the invention.

Referring now to FIG. 2, a cross sectional schematic view of an exemplary security document 200 according to an embodiment of the invention is shown. Security document 200 is preferably provided as a thin flexible sheet, such as may be applied to many typical kinds of security documents such as but not limited to banknotes, passports, certificates, identification documents, financial documents, authentification certificates, and other value papers, for example. Similar to as described above in reference to FIG. 1, the security document 200 comprises a document substrate 212 in which other components of the security document 200 may be embedded and/or on which other components may be attached or printed, for example. The substrate 212 may be formed of any suitable substrate material such as cellulose and/or polymer based materials, for example, and more particularly, such as polypropylene polymer materials. The security document 200 and substrate 212 may comprise any suitable thickness while preferably allowing for flexibility of the security document 200 as may be desired for use in a particular application. In one aspect applied for use as a banknote, the security document 200 and substrate 212 may preferably comprise a thin sheet less than about 400 μm thick, and more preferably between about 100 μm to 200 μm thick.

Security document 200 additionally comprises an electrical circuit embedded in and/or attached to substrate 212, comprising electrically connected electroactive polymer power source 208, electroactive polymer power storage element 202, and OLED optical display element 204. In the illustrated embodiment of the invention, electroactive polymer power source 208 comprises two thin electroactive polymer strips 208 located adjacent to either face of the security document 200, which are operable to generate electrical power upon mechanical deformation of the strips, such as by bending or folding of the security document 200, for example. Any suitable electroactive polymer material capable of producing electrical power in response to mechanical deformation may be used to form the electroactive strips 208, however, in a particular embodiment, the electroactive polymer strips 208 may preferably comprise a layered ionic polymer metal composite material. The thickness of the electroactive polymer strips 208 may vary depending upon the desired physical and electrical properties of the security document 200, but in a typical application for use in a banknote, the thickness of electroactive polymer strips 208 may preferably be between about 50 to 100 μm, for example.

In the embodiment shown in FIG. 2, electroactive polymer power storage element 202 comprises two thin electroactive polymer strips 202 located adjacent to either face of the security document which are operable as a capacitor to store electrical power generated by the electroactive power source 208. However, in other alternative embodiments, power storage element 202 may comprise a single electroactive polymer component or multiple electroactive polymer components arranged in other configurations within security document 200, or may be integrated as part of power source 208 for producing and storing electrical power, for example. Electroactive polymer power storage strips 202 may also be formed from any suitable electroactive polymer material capable of storing electrical power for use in powering the optical display element 204. However, a particular embodiment, electroactive polymer power storage strips 202 may desirably comprise a layered ionic polymer metal composite material, comprising a central ionic polymer core 222 with metal film electrodes 224 and 226 attached to either side of the polymer core 222, for example. Such layered ionic polymer metal composite materials may desirably be formed in very thin sheet forms with thicknesses as little as 50 μm, and may desirably provide a useful capacitance for storing electrical power between about 0.1 and 1 μF/cm, while providing flexibility and a discharge rate of preferably less than about 50 percent in an 8 hour period, for example. Accordingly, the electroactive polymer power storage strips 202 may desirably provide effective capacitive storage within security document 200 of electrical power generated by the power generation element 208, in a desirably thin and flexible form, in order to provide electrical power to optical display element 204.

Optical display element 204 comprises an exemplary OLED display which illuminates to provide a visible optical display pattern when powered by electropolymer power storage element 202 and/or electropolymer power generation element 208. The OLED display element 204 comprises an organic OLED electrolyte layer 244 and at least one nanohole array layer 242 comprising a pattern of nanoholes which have sub-wavelength dimensions relative to the wavelength(s) of light emitted by the OLED display 204. The OLED electrolyte layer 244 comprises one or more organic electroactive dyes that emit light when powered by electrical energy, and any suitable known OLED electrolyte materials may be used to form the electrolyte layer 244 of the OLED optical display 204. The nanohole array layer 242 may be situated on top of the electrolyte layer 244, or the OLED display element 204 so that it is effective to alter the light emitted by the OLED electrolyte layer 244 when the OLED display 204 is powered. For example, the nanohole array layer 242 may act as one or more of a tunable aperture or filter for the OLED display 204. Accordingly, the effect of the nanohole array layer 242 in the OLED display element 204 is desirably to produce a distinct and recognizable pattern of light emitted by the OLED display 204 that is visible to a user and may be used to authenticate the security document 200 by the user. For example, the nanohole array layer 242 may be effective to increase the intensity of the light emitted by the OLED display 204, or may be effective to change the colour, or pattern or other parameter of light emitted by the display 204, to produce a distinct and recognizable pattern or effect which is visible to a user of the security document 200 and may be used for self-authentication of the security document 200. In other embodiments, alternative types of optical displays may be utilized, such as but not limited to electrofluorescent dye displays, flexible light emitting diode displays and electroluminescent dye displays, for example, such as are described above with reference to FIG. 1.

In a particular embodiment, the nanohole array layer 242 may be integrated as an electrode of the OLED display 204, and may be used in combination with one or more other electrode layers to transmit electrical power through the electrolyte layer 244 and to thereby illuminate the OLED display 204. In a further preferred embodiment, the nanohole array layer 242 desirably have the effect of increasing the intensity of light emitted by the OLED display 204 relative to a similar OLED display without such a nanohole array, and thereby decrease the electrical power required to emit a given intensity of light from the display 204, and thereby also reduce the amount of electrical power that must be generated by electropolymer power generation element 208 and stored by electroactive polymer storage element 202 to produce a given intensity of light, and increasing efficiency of the electrical circuit.

The security document 200 also comprises a switch element 216 which is electrically connected to the OLED display 204, and at least one of the electroactive polymer power generation and storage elements 208 and 204. The switch element 216 may be used to control the supply of electrical power on and off to the OLED display 204, and thereby to control the illumination of the display 204 as desired by a user. In a particular embodiment, the switch element 216 may comprise an electroactive polymer switch which may be activated by applying pressure to the switch element 216, such as by pressing and/or squeezing the security document 200, to activate the switch and illuminate the OLED display 204. In alternative embodiments, other suitable materials may be used to comprise the switch element, such as known piezoelectric or contact type switches, which may be provided as a thin element for use embedded within the substrate 212 of the security document 200. In yet another alternative embodiment, the switch element 216 may be omitted from the electrical circuit of the security document 200, and the illumination of the OLED display may be controlled directly by the electroactive polymer power generation and/or storage elements 208 and 202, for example.

The security document 200 illustrated in FIG. 2 also comprises a photovoltaic cell 206. Photovoltaic cell 206 comprises an active photopolymer layer 264, and at least one nanohole array layer 262. The photovoltaic cell 206 is electrically connected to the electrical circuit within the security document 200, and thereby to electroactive polymer power storage element 202 and/or directly to OLED display 204. Photovoltaic cell 206 is operable to convert photonic energy from a light source incident on the photopolymer layer 264 of the cell 206 into electrical power which may be used to power the OLED display 204 and to augment electrical power generated by electroactive polymer power generation element 208. Electrical power generated by photovoltaic cell 206 may also be stored in the electroactive polymer power storage element 202 for later use to illuminate the OLED display 204, such as when a user activates switch element 216, for example. The nanohole array layer 262 comprises at least one nanohole array comprising a pattern of sub-wavelength dimension nanoholes relative to at least one wavelength of light incident on the photovoltaic cell 206. The nanohole array layer 262 is thereby desirably functional to increase the intensity of light reaching the photopolymer layer 264 relative to the intensity of the external light incident on the photovoltaic cell 206, so as to increase the efficiency of electrical power production by the photovoltaic cell 206 for a given intensity of incident light. In one aspect, the nanohole array layer 262 may be tuned to act as at least one of a tunable aperture and filter relative to the light incident on the photovoltaic cell 206. In a preferred embodiment, the nanohole array layer 262 is integrated into the electrical structure of the photovoltaic cell 206 and acts as an optically transmittive surface electrode of the photovoltaic cell 206. Accordingly, in such preferred embodiment, the nanohole array layer 262 may be used to replace a conventional transparent surface electrode of the photovoltaic cell, such as an indium tin oxide electrode, and may thereby be used to reduce the overall thickness of the photovoltaic cell 206 which is desirable for use in thin and flexible security documents 200 such as banknotes, passports, certificates, and other value papers, for example.

The security document 200 also comprises a nanohole array security thread 210, similar to as described above in reference to FIG. 1, which comprises at least one nanohole array comprising a series of sub-wavelength dimension nanoholes relative to at least one wavelength of an incident light source. The nanoholes may be arranged in a distinct pattern so as to affect the transmission of the incident light through the nanohole array, or to affect the light reflected by the nanohole array. In one embodiment, the nanohole array security thread 210 comprises at least one nanohole array that is readable by an authentication machine, such as by illumination of the nanohole array security thread by an external light source, to produce a distinct light pattern which may be detected and verified by an optoelectronic sensor in the authentication machine to authenticate the security document 200. In another embodiment, the nanohole array security thread 210 comprises one or more nanohole arrays with nanoholes arranged in a pattern that is visible and distinct when viewed under a high-powered microscope, such as a scanning electron microscope, for example, to form a recognizable picture or "nano-art". Such picture or nano-art in the nanohole array security thread 210 may then be identified and verified by a user by viewing the security document 200 under a high-powered microscope, in order to authenticate the security document 200.

Figure 3:
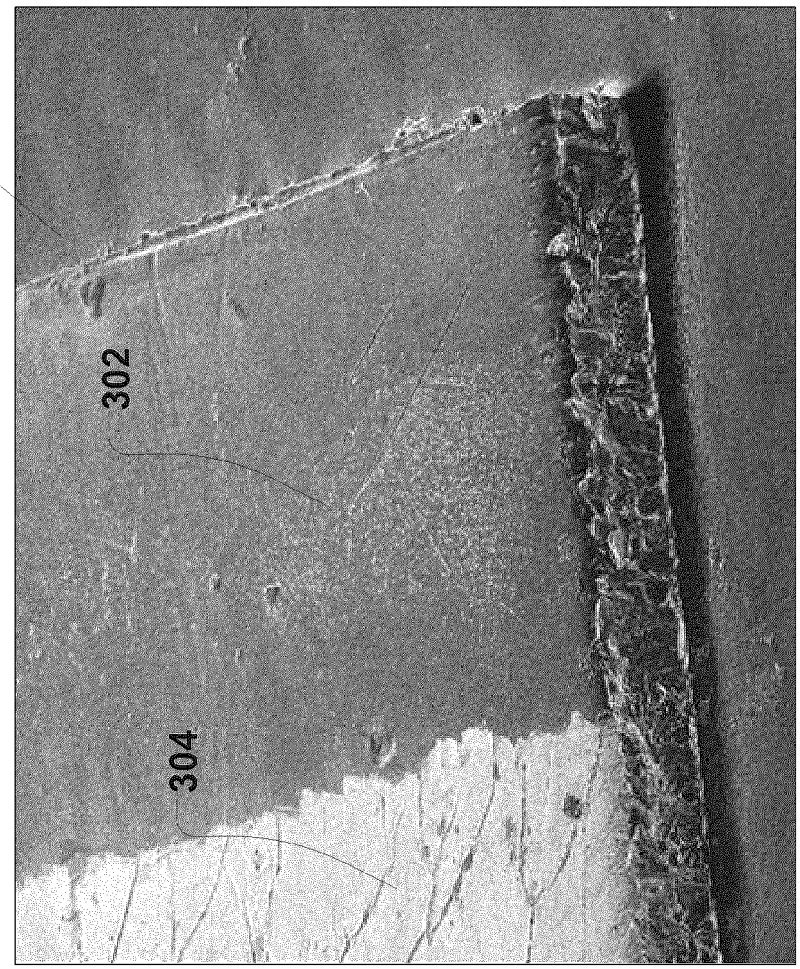
FIG. 3 illustrates a perspective view scanning electron microscope (SEM) micrograph of a layered electroactive polymer electrical circuit component according to an embodiment of the invention.

Referring to FIG. 3, a perspective view scanning electron microscope (SEM) micrograph of a layered electroactive polymer electrical circuit component 300 according to an embodiment of the invention is shown. The layered electroactive polymer component 300 comprises an electroactive polymer core layer 302, and at least one electrode layer 304 applied to a surface of the electroactive polymer core layer 302. The layered electroactive polymer component 300 may be used in security documents of the present invention as electroactive polymer power generation or storage elements, or as a switch element, for example, as described above with reference to FIGS. 1 and 2. Accordingly, the layered electroactive polymer component 300 is desirably operable either to generate electrical power in response to mechanical deformation of the component 300, to store electrical energy as a capacitor, or both.

The electroactive polymer layer 302 may preferably comprise an ion-exchange or ionic polymer material, such as tetrafluoroethylene, polyethylene and/or polyamide based ionic polymers, for example. Examples of commercially available ionic polymers include Nafion™ 115 and 117, for example, which are sold by the E.I. DuPont et Nemours Company. The electroactive polymer component 300 also preferably comprises two electrode layers 304 attached to opposing substantially planar surfaces of the electroactive polymer core layer 302. Each electrode layer 304 comprises an electrically conductive material, and may be deposited or otherwise formed on the surface of the polymer core layer 302, or alternatively may be independently formed and attached to the polymer core layer 302 such as by adhesion, for example. In one aspect, the electrode layer 304 comprises at least one electrically conductive material, such as chromium, gold, silver, platinum, copper, aluminum, conductive polymers or combinations thereof, for example.

In one embodiment, the electroactive polymer component 300 is formed as a layered ionic polymer metal composite component, and is functional to generate an electrical potential between the two electrode layers 304 in response to mechanical deformation of the component 300, such as mechanical deformation in a direction substantially perpendicular to the surface of the electrode layers 304 which may be caused by bending or folding the component 300, for example. In a security document according to the present invention, such a component 300 may accordingly be used to generate electrical power from the mechanical deformation of the security document and embedded component 300, and such electrical power may be used to power an optical display element, for example, such as to illuminate the optical display for the purposes of authenticating the security document. In such an embodiment, the polymer core layer 302 may comprise a hydrated or non-hydrated ionic polymer material, and electrode layers 304 may be attached to the polymer core layer 302 such as by embedding the electrode layer 304 into the surface of the polymer core layer 302, or by depositing the electrode material onto the surface of the polymer core layer 302 such as by sputtering, chemical and/or vapour deposition, or by attaching a preformed layer of electrode material to the surface of the polymer core layer 302 such as by adhesion to form the electrode layer 304.

In a second embodiment, the electroactive polymer component 300 is formed as a layered ionic polymer metal composite component, and is functional to store electrical energy as an ionic polymer metal composite capacitor component 300 such that the component 300 may be charged and discharged by connection to an electrical power source or load, respectively. In a security document according to the present invention, such a component 300 may accordingly be used to store electrical power from an electrical power source such as an electroactive polymer power generation component, or a photovoltaic cell, for example. The component 300 may then also be used to provide power to an electrical power load, such as an optical display element, to illuminate the optical display for the purposes of authentication of the security document. In such an embodiment, the polymer core layer 302 may comprise a non-hydrated ionic polymer material such as a non-hydrated tetrafluoroethylene based ionic polymer, of which Nafion™ 115 and 117 are examples. Each electrode layer 304 may be attached to the polymer core layer preferably by depositing at least one electrically conductive metallic material onto the surface of the polymer core layer 302 to form the electrode layer 304. Preferably, at least one conductive metal material may be deposited onto the polymer core layer 302 by ion sputtering, chemical deposition or vapour deposition, to form the electrode layer 304. In a particular embodiment, a first layer of chromium about 100 nm thick followed by a second layer of gold about 300 nm thick may be sequentially deposited using a suitable known sputtering technique onto a non-hydrated ionic polymer core layer 302 which is between about 50-150 µm thick, to form the electrode layer 304 and polymer core layer 302 of a layered ionic polymer metal composite capacitor component. In other alternative embodiments, the layered ionic polymer metal composite component 300 may be functional to both generate and store electrical power embedded in a security document according to the invention, to provide electrical power to the optical display element of the security document.

Figure 4:
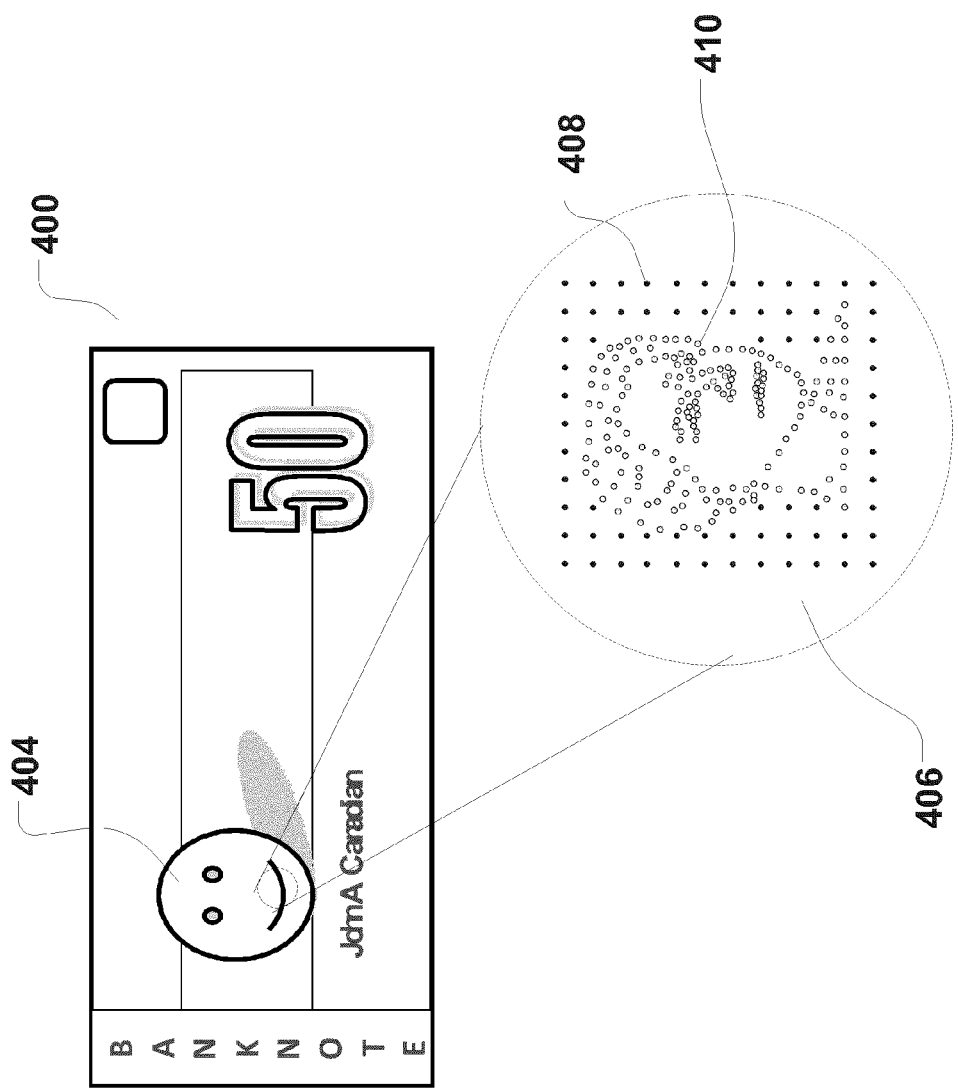
FIG. 4 illustrates a top view of a security document comprising a nanohole array display element according to an embodiment of the invention.

Referring to FIG. 4, a top view of a security document 400 comprising a nanohole array display element 404 according to an embodiment of the invention is shown. In one embodiment, the security document 400 may be substantially similar to the security document embodiments described above with reference to FIGS. 1 and 2. The security document 400 of the present embodiment, comprises an optical display element 404 which comprises at least one nanohole array. As described above in reference to FIG. 2, the nanohole array in the optical display element 404 may preferably comprise a defined pattern of sub-wavelength dimension nanoholes relative to at least one wavelength of light incident on or transmitted by the optical display element 404, so that the nanohole array is operable to alter the pattern, intensity, colour and/or other parameters of light passing through or reflected by the nanohole array so as to create a visible optical effect. Accordingly, the optical effect produced by the nanohole array in the optical display element 404 may desirably be used to authenticate the security document 400, either by an unaided user viewing a visible optical effect, or through the use of an authentication device or automated machine which can detect and verify the optical effect created by the nanohole array.

In another embodiment, the security document 400 may comprise a nanohole array security thread comprising at least one nanohole array 406. In one aspect, the nanohole array security thread and nanohole array 406 may comprise an integral part of optical display element 404, however in another aspect, the nanohole security thread and nanohole array 406 may be separate from optical display element 404 and may be located either close to optical display element 404 or at another location on security document 400. Nanohole array 406 comprised in the nanohole array security thread, comprises at least one set of nanoholes with sub-wavelength dimensions relative to at least one wavelength of light incident on the nanoholes, such that the nanohole array functions to alter one or more parameters (such as colour, intensity and/or pattern, for example) of light transmitted and/or reflected by the nanohole array 406. In the exemplary embodiment illustrated in FIG. 4, nanohole array 406 comprises two sets of nanoholes 408 and 410, which are each arranged in a distinct pattern. A first set of nanoholes 408 are arranged in an exemplary periodic grid pattern such as may typically be applied in security document 400 to alter one or more parameters of light transmitted and/or reflected by nanohole array 406, for example. A second set of nanoholes 410 are arranged in an exemplary non-periodic pattern to create an image (such as that of a figurehead or other recognizable subject) which may be recognized when the nanohole array 406 is viewed with the aid of a high-power microscope, such as an SEM, for example, or in an alternate embodiment, when viewed with the naked eye. The arrangement or pattern of the second set of nanoholes 410 to represent an image may be referred to as "nano-art" for example.

Accordingly, the nanohole array 406 may desirably provide for authentication of the security document 400 by one or more authentication methods or modes. According to a first mode for example, a focused and/or laser light beam with known parameters (such as wavelength, intensity, etc.) may be focused on the nanohole array 406 such that the distinct pattern of nanoholes 408 in the nanohole array 406 functions to alter at least one parameter of the incident light beam and the altered light transmitted and/or reflected by the nanohole array 406 may be detected optically or by a sensor means (such as an optoelectronic sensor for example) to provide a pattern or signal which is detectable or otherwise readable by a user, or an instrument or automated authentication machine. Accordingly, by verifying the detected pattern or signal resulting from the altered light beam transmitted and/or reflected by the nanohole array 406, the security document 400 may be authenticated. According to a second mode for example, a high-powered microscope (such as an SEM for example) may be used to examine the nanohole array 406 and to detect the pattern and/or distinct arrangement of nanoholes 410 in nanohole array 406. Accordingly, by recognizing and/or otherwise verifying the pattern of nanoholes 410 and in particular the distinct image formed by the nanoholes 410, the security document 400 may be authenticated.

Figure 5:
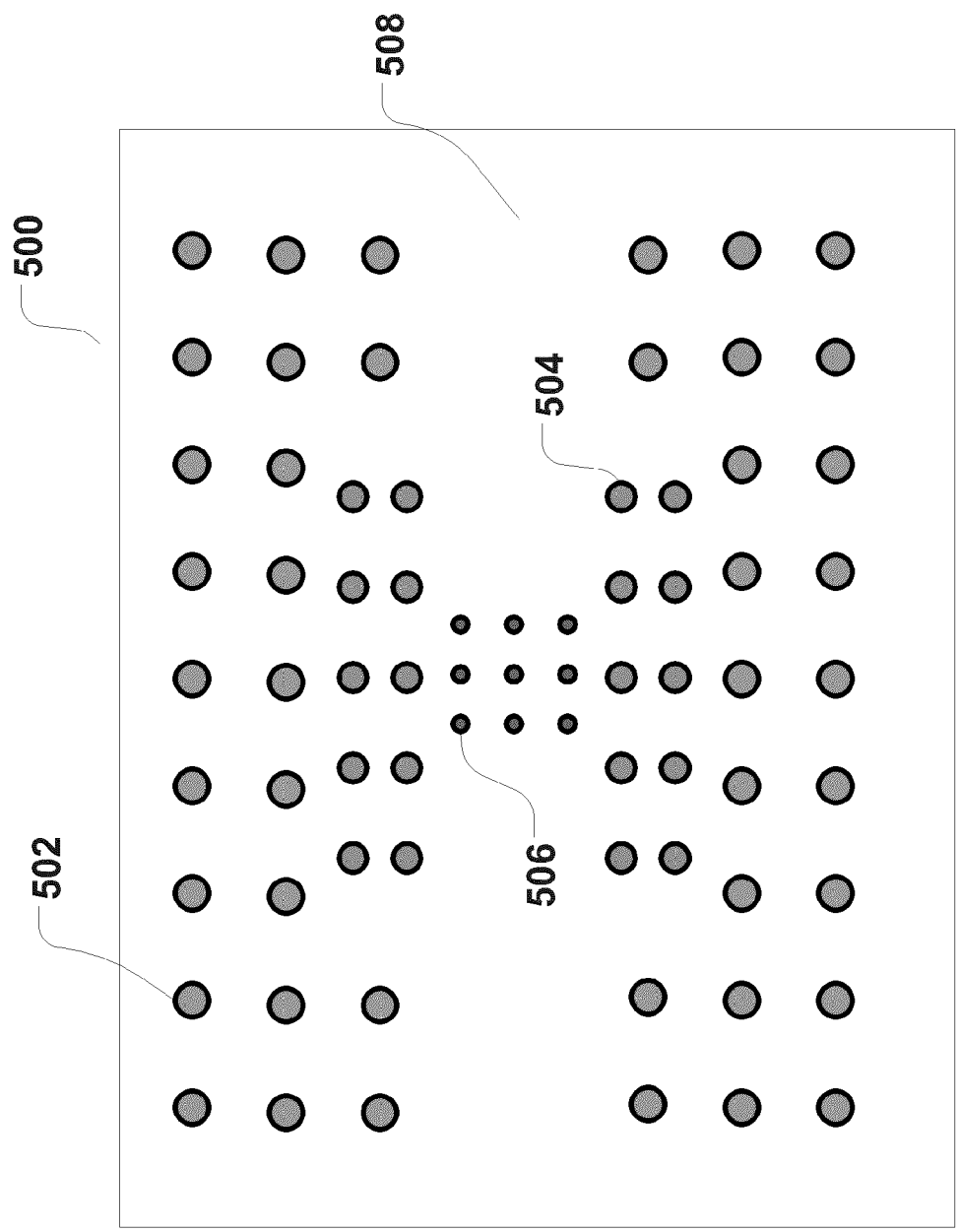
FIG. 5 illustrates a schematic view of a nanohole array according to an embodiment of the invention.

Referring to FIG. 5, a schematic view of a nanohole array 500 according to an embodiment of the invention is shown. Nanohole array 500 comprises three exemplary sets or patterns of nanoholes, 502, 504 and 506, respectively, which are formed in a nanohole array substrate 508. The nanohole array substrate 508 may comprise any thin electrically and/or electromagnetically conductive material which is suitable to support one or more sets of nanoholes extending into and/or through the substrate 508, and is further preferably opaque to incident light. In one embodiment the nanohole array substrate may comprise a thin film of silicon, a thin metal film such as gold, aluminum and/or silver, or a thin film of another suitable electrically and/or electromagnetically conductive material, for example. In a particular embodiment for application to security documents according to embodiments of the present invention, the nanohole array substrate 508 may comprise a part of the security document and/or may be embedded in or otherwise integrated with a security document substrate material, for example. In alternative embodiments, the nanohole array substrate 508 may comprise a separate material which may be attached or applied to the security document such as by utilizing a suitable known adhesive material such as may commonly be used in microelectromechanical (MEM) or optical devices such as liquid photopolymers, for example.

On or more patterns or sets of nanoholes may be formed in a suitable nanohole array substrate 508, such as exemplary sets of nanoholes 502, 504 and 506 for example. The dimensions of such nanoholes may preferably be such that at least one dimension of the nanoholes or nano-features is less than a wavelength of light incident on the nanohole array 500 during use of the nanohole array 500, such as in a security document. Such nanoholes may be described as sub-wavelength in dimension, and are known to be functional to affect one or more characteristics or parameters of an incident light beam (such as colour, pattern and intensity for example) that is transmitted and/or reflected by the nanohole array 500. In one aspect, the nanoholes 502, 504 or 506 may function as one or more of an aperture and a filter with respect to an incident light beam that is transmitted and/or reflected by the nanohole array 500. In a particular embodiment, nanohole array 500 may comprise a nanohole substrate 508 and three exemplary sets or patterns of nanoholes extending through the substrate 508, in which nanoholes 502 are about 200 nm in diameter, nanoholes 504 are about 100 nm in diameter, and nanoholes 506 are about 50 nm in diameter, for example, such that all three sets of nanoholes 502, 504, and 506 are sub-wavelength in dimension relative to the visible light spectrum, for example. In one embodiment, nanohole sets or patterns 502, 504, and 506 are arranged in substantially periodic or grid-like patterns as illustrated in FIG. 5. In another embodiment however, any of nanohole sets 502, 504 and 506 may be arranged in other patterns, such as non-periodic or quasi-random patterns, or patterns representing shapes, images or other ordered patterns, for example.

Nanohole array 500 may be formed from any suitable electrically and/or electromagnetically conductive thin sheet substrate material 508, as described above, and nanoholes 502 may be formed in the substrate 508 by any suitable known technique capable of producing sub-wavelength nanoholes in a selected pattern. In one embodiment, nanohole array substrate 508 may comprise a suitable electrically and/or electromagnetically conductive thin sheet such as a thin sheet of silicon, and nanoholes or nano-features 502, 504 and 506 may be formed in substrate 508 by means of focused ion beam (FIB) milling, for example. In particular, a gallium FIB may be used to directly mill nanoholes or nano-features 502, 504 and 506 of desired sub-wavelength dimensions and arranged in one or more desired patterns in substrate 508, or alternately, an e-beam (electron beam) may be used with an e-beam resist according to an e-beam lithographic method to create nanohole or nano-feature patterns in substrate 508. In another embodiment, a nano-imprint lithography method may be used to form nanohole array 500, wherein a nano-imprint lithographic mould may be produced comprising the desired sets or patterns of nanoholes or nano-features to be comprised in the nanohole array 500, and the desired nanohole patterns may be mechanically imprinted onto a resist and then transferred to the nanohole substrate 508 to produce the desired nanohole array 500. Suitable nano-imprint moulds may be produced by known methods, such as by FIB milling of desired nanohole or nano-feature patterns into a suitable mould material, such as fused silicon, for example. In another such embodiment, nano-imprint moulds may be produced by using e-beams (e-beam lithography), x-rays (x-ray lithography) or deep UV light (deep UV lithography) to mill desired sets or patterns of nanoholes or nano-features into the mould material, Similarly, the desired nanohole or nano-feature patterns may be mechanically imprinted onto a suitable resist material, which may be cured to retain the imprint of the nanohole patterns. In one aspect, a thermoplastic material such as a thermoplastic polymer may be used as a resist material, and following imprinting with the mould the resist may be thermally cured by heating the resist to retain the nano-imprint. In a second aspect, a photochemical material such as photopolymers may be used as a resist material, and may be photocured such as by exposure to UV light, for example. In yet a further embodiment, desired nanohole or nano-feature patterns may be directly formed in the substrate material 508 by mechanical means, such as by nano-inscription whereby a hardened inscriber comprising a master nano-feature pattern may be used to inscribe the substrate 508 to create nanohole or nano-feature patterns, such as patterns comprising nano-gratings, slits or slots of sub-wavelength dimension, for example.

In another embodiment, the nanohole array 500 may comprise an electrically conductive nanohole array substrate 508 such that the nanohole array 500 is electrically conductive. In such embodiment, the nanohole array 500 may be integrated with an optical display element in a security document, such as an OLED display element. In such case the nanohole array may desirably function as an electrode of the optical display element and also function to alter one or more parameters or characteristics (such as colour, intensity or pattern for example) of light transmitted and/or emitted by the display element. Such integration of nanohole array 500 may be desirable to replace a conventional electrode material, such as indium tin oxide, for example, in an optical display element of a security document according to the present invention. In a further embodiment, an electrically conductive nanohole array 500 may be integrated with a photovoltaic cell in a security document, and may desirably function as an electrode of the photovoltaic cell, to replace a conventional electrode material. In such case, the nanohole array 500 may also desirably function as a tunable optical element such as an aperture or filter to alter at least one parameter of the light incident on the photovoltaic cell, such as to increase the intensity of the light, for example. According, such an increase in the intensity of light incident on the photovoltaic cell may be desirable to increase the efficiency and/or power generated by the photovoltaic cell, for example.

Figure 6:
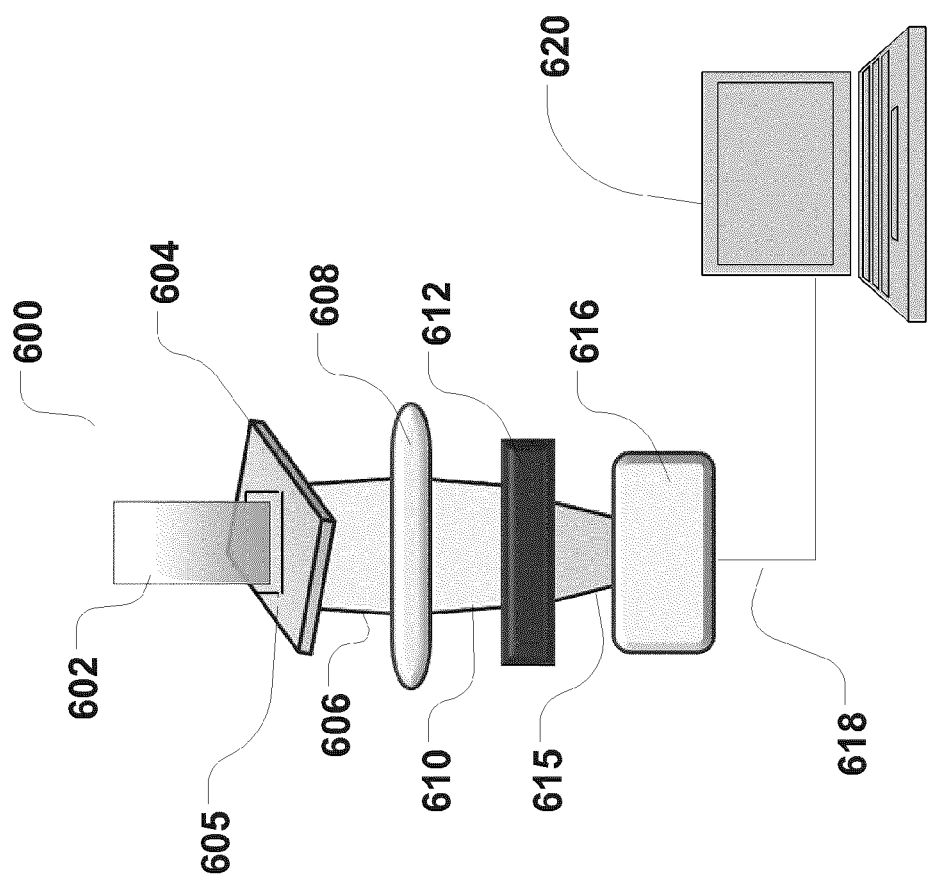
FIG. 6 illustrates a schematic view of an apparatus for authenticating a security document comprising a nanohole array according to an embodiment of the invention.

Referring to FIG. 6, a schematic view of an apparatus 600 for authenticating a security document 604 comprising a nanohole array 605 according to an embodiment of the invention is shown. The security document 604 comprises at least one nanohole array 605 comprising at least one set or pattern of sub-wavelength dimension nanoholes or nano-features, relative to at least one wavelength of an incident light beam 602. The security document 604 may also preferably comprise an electrical circuit embedded in the security document 604, or in a substrate forming the backbone of the security document 604. In a preferred embodiment, the electrical circuit embedded in the security document 604 may also comprise at least one electroactive polymer power generating and/or power storage element, and at least one optical display element, such as an electroluminescent display or an OLED display for example. In such preferred embodiment, the nanohole array 405 may desirably be integrated into the optical display element, such as part of an electrode of the optical display element, for example. In an alternative embodiment, the nanohole array 605 may be located separate from an optical display element in the security document 604. In either embodiment, the nanohole array 605 may preferably be encoded, such that the set or pattern(s) of nanoholes comprised in the nanohole array 605 are effective to predictably and repeatably alter at least one parameter or characteristic (such as colour, intensity or pattern for example) of the incident light beam 602 transmitted through and/or reflected by the nanohole array 605.

The apparatus 600 comprises an incident light beam 602, such as a focused light beam or laser light beam, for example, that comprises at least one known wavelength of light. The incident light beam 602 may be produced by any known focused, collimated or laser light source suitable to emit a coherent incident light beam 602 to illuminate the nanohole array 605 in security document 604. Upon illumination of the nanohole array 605 with incident light beam 602, a first transmitted light beam 606 is transmitted through the nanohole array 605, where at least one of the parameters or characteristics of the first transmitted light beam 606 is altered by the effect of the nanoholes or nano-features in nanohole array 605. In one aspect, the nanohole array 605 may act as one or more of an aperture and/or filter with respect to the incident light beam 602. In another aspect, incident light beam 602 may comprise multiple wavelengths of light, at least one wavelength of which is altered by transmission through nanohole array 605 to form first transmitted light beam 606. Preferably, the parameters or characteristics of incident light beam 602, such as wavelength and intensity for example, correspond to defined known values, such that transmission through a nanohole array 605 having a known configuration of nanoholes or nano-features arranged in a defined pattern will result in first transmitted light beam 606 having parameters corresponding to known and repeatable values, for example.

The apparatus 600 also comprises an optical lens element 608 such as a collecting lens, for example. Lens 608 may be used to focus the first transmitted light beam 606 that is transmitted by nanohole array 605 to form a second transmitted light beam 610. In one aspect, lens 608 may preferably be a convex or focusing lens, such as to focus the first transmitted light beam 606. In a second aspect, lens 608 may comprise a concave or dispersing lens suitable to spread the first transmitted light beam 606. In some embodiments, lens 608 may be optional or omitted from the apparatus 600, depending upon factors such as the characteristics of the first transmitted light beam 606 as transmitted through the nanohole array 605, for example.

The apparatus 600 further comprises a filter 612 such as notch filter or a polarizing filter for example. Filter 612 may be used to optically filter the second transmitted light beam 610 (or in embodiments where lens 608 is omitted, to filter first transmitted light beam 606) such as to remove one or more components of the light beam entering the filter 612, and transmitting filtered light beam 615. In one aspect, filter 612 may be a notch filter functional to remove one or more incident wavelengths from light beam 610 (or 606) resulting in filtered light beam 615. Alternatively, notch filter 612 may allow only specific desired incident wavelengths of light beam 610 to pass through as filtered light beam 615. In another aspect, filter 612 may be a polarizing filter functional to remove at least one incident polarity of light beam 610 (or 606) resulting in polarized light beam 615. In an alternative embodiment, lens 608 and filter 612 may be arranged in reverse order so that light beam 606 passes first through filter 612 before lens 608. In a further alternative embodiment, apparatus 600 may comprise additional optical elements, such as lenses and/or filters for example, such as may be desired to direct and/or optically define light beam 606 transmitted by nanohole array 605.

The apparatus 600 comprises an optical sensor 616 that is functional to detect at least one parameter or characteristic (such as wavelength, intensity or pattern, for example) of filtered light beam 615 which is incident on the sensor 616, and to produce a signal representing the detected parameter(s) of light beam 615. In a preferred embodiment, sensor 616 comprises an optoelectronic sensor, such as a charge coupled device (CCD) sensor, or a complementary metal-oxide semiconductor (CMOS) sensor, for example. In such case, sensor 616 functions to create an electronic signal representing one or more detected parameters of light beam 615. Sensor 616 may desirably be connected to a computer processor 620, such as by electrical connection 618, to transmit the electronic signal produced by sensor 616 to be analyzed and/or processed by the computer processor 620. Computer processor 620 may comprise any suitable processing device functional to analyze the electronic signal produced by sensor 616 and to compare it to a predetermined or otherwise known reference or authentication signal, which may be stored or otherwise accessed by the computer processor 620. Such reference or authentication signal may be predetermined based the parameters of light beam 615 which are known to result from transmission of known incident light beam 602 through an authentic nanohole array 605 configuration in an authentic security document 604, and thereafter through lens 608 and/or filter 612 elements, as detected by sensor 616. In one aspect, computer processor 620 may be integrated with sensor 616, or alternatively, may be situated in a general purpose computer separate from the remaining elements of apparatus 600. In an alternative embodiment, sensor 616 may comprise an optical sensor and may produce an optical signal representing at least one parameter of light beam 615. In one aspect of such alternative embodiment, the optical signal produced by optical sensor 616 may be visible by an unaided user to enable the user to analyze the optical signal and authenticate the security document 604. In another aspect, the optical signal may be visible using a microscope or other optical scope to enable analysis and authentication of the security document 604 by a user or by another machine or computer, for example.

The apparatus 600 may be integrated into a single machine for authentication of security documents 604, such as an automated scanner or verification machine. In one embodiment directed to banknote or other currency security documents 604, apparatus 600 may be integrated into an automated teller machine (ATM), or point of purchase scanner machine, for example, which can be used to authenticate banknote security documents 604 that comprise a nanohole array 605. In another embodiment directed to passports, driver's license or other identity security documents 604, apparatus 600 may be integrated into a scanning and/or verification machine, for example, which can be used at an access control point such as airport screening or border crossing locations for example, to authenticate identity security documents 604 that comprise a nanohole array 605.

A method of authenticating a security document 604 is provided according to an embodiment of the invention, wherein the method may be enabled by use of the apparatus 600. A security document 604 desired to be authenticated is provided, comprising an electrical circuit embedded in or otherwise attached to or applied on a document substrate of the security document 604. The electrical circuit of the security document 604 comprises at least one electroactive polymer power generating means, and optical display means, and at least one encoded nanohole array 605. The optical display means may comprise an electroluminescent display element, and in one aspect, the nanohole array 605 may be integrated as a layer of the display, such as an electrode layer for example. In a first step, the nanohole array 605 of the security document 604 is illuminated with a focused or laser light source that emits a focused, collimated and/or laser incident light beam 602 which comprises at least one defined wavelength of incident light which illuminates the nanohole array 605. The nanohole array 605 acts to alter at least one parameter (such as wavelength, intensity or pattern for example) of the incident light beam 602 according to the configuration of nanoholes or nano-features in the nanohole array 605, to result in the transmission of a portion of the altered incident light beam 602 as transmitted light beam 606. Transmitted light beam 606 may in some embodiments be further optically transmitted through lens 608 and/or filter 612 elements to result in a final transmitted light beam 616.

In a second step, the transmitted light beam 615 which has been transmitted through the nanohole array 605 is detected by optoelectronic sensor 616. The optoelectronic sensor 616 detects at least one wavelength of light present in transmitted light beam 615. In a third step, the at least one wavelength of light detected in transmitted light beam 615 is analyzed to produce a detected signal. In one aspect, the optoelectronic sensor 616 is operable to detect multiple wavelengths of light in light beam 616 and to produce at least one detected signal representing one or more parameters of the detected light beam 615. In another aspect, the optoelectronic sensor may analyze all of the parameters of the detected light beam 615 (including at least wavelength and intensity for example) to produce a single detected signal.

In a fourth step, the detected signal is compared with an authentication signal to authenticate the security document. In one aspect, a computer processor or other processing means 620 may receive the detected signal from the optoelectronic sensor 616 and compare it with an authentication signal stored in or otherwise accessed by the computer 620. The authentication signal may comprise a known reference signal which corresponds to the transmitted beam of light 615 which would be transmitted by the nanohole array of an authentic security document 604. In such case, the computer may compare one or more aspects of the detected signal with the authentication signal to determine if the detected signal matches the authentication signal within suitably defined tolerances or parameters. If the detected signal is determined to match the authentication signal within suitable tolerances, the computer 620 may produce a signal indicating that the security document 604 is authentic. In an alternative embodiment, the detected signal produced by the sensor 616 may be compared with an authentication signal by visual inspection, such as by a user, or other optical, mechanical or biological means of inspection, for example.

Accordingly, the method of authenticating a security document described above may desirably be implemented by an automatic machine such as an electronic scanning and/or verification machine for example. Common examples of such electronic verification machines which may be used to implement the authentication method described above include ATM or point of purchase scanning machines for banknote or other currency-related security documents, and access point scanning machines for passports or other identity-related security documents, for example.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A security document comprising an optical element embedded in a document substrate, said optical element comprising:
    a first nanohole array comprising a plurality of nanoholes arranged at nodes of a first two-dimensional periodic grid, said first two-dimensional periodic grid having a first periodic spacing between said nanoholes, said nanoholes comprising at least one dimension smaller than 400 nm; and
    a second nanohole array comprising a plurality of nanoholes arranged at nodes of a second two-dimensional periodic grid, said second two-dimensional periodic grid having a second periodic spacing between said nanoholes different from said first periodic spacing, said nanoholes comprising at least one dimension smaller than 400 nm;
    wherein said optical element comprises at least one of a metal film nanohole array and an electrically conductive film nanohole array;
    wherein said optical element is powered by at least one of: a power source comprising at least one electroactive polymer power generator; an optical display comprising at least one display element powered by an electrical power source; and an external light source; and
    wherein said optical element is operable to produce at least one optical authentication effect.

2. The security document according to claim 1 comprising said power source, wherein said power source additionally comprises a power storage element, and said power storage element comprises an electroactive polymer.

3. The security document according to claim 1 comprising said power source, wherein said electro active polymer power generator comprises an ionic polymer metal composite material which is operable to produce an electrical current in response to mechanical deformation of said security document.

4. The security document according to claim 3 wherein said electroactive polymer power generator comprises a metal film and non-hydrated polymer layered ionic polymer metal composite structure.

5. The security document according to claim 1 comprising said optical display, wherein said display element comprises at least one of: an electrofluorescent dye display, an electroluminescent display, a light emitting diode display, an organic light emitting diode display, and an electronic ink display.

6. The security document according to claim 1 comprising said optical display, wherein said optical element is affixed to the surface of said optical display and comprises at least one of: an electrode of said optical display, an optical filter of said optical display and an optical aperture of said optical display.

7. The security document according to claim 1 wherein said optical element is operable to produce at least one of: an optical authentication effect visible to an unaided human eye; an optical authentication effect readable by a sensor under either laser light or light beam illumination; and an optical authentication effect visible under microscope or other visual instrument.

8. The security document according to claim 1 wherein said security document comprises one of: a banknote, a credit card, a financial document, a passport, an identification card, an authentication certificate, a value paper, a seal, and a product identification device.

9. The security document according to claim 1 wherein said optical element comprises said metal film nanohole array and said metal film nanohole array is optically opaque, further comprising a dielectric medium in contact with said metal film nanohole array.

10. The security document according to claim 1, wherein said document substrate comprises at least one of: a paper material, a polymer material, a polypropylene film material, a polyethylene film material, a polyethylene terephthalate (PET) film material, a polydimethylsiloxane (PDMS) film material, a poly(methyl methacrylate) (PMMA) film material, and a combination thereof.

11. The security document according to claim 1, wherein said nanoholes comprise a depth dimension extending perpendicular to at least one of said metal film and said electrically conductive film, and said nanoholes extend at least one of into or out of at least one of said metal film and said electrically conductive film.

12. A security document comprising an electrical circuit embedded in a document substrate, wherein said electrical circuit comprises:
at least one electroactive polymer element; and
an optical display comprising at least one optical element disposed as at least one layer of said optical display, said optical element comprising:
a first nanohole array comprising a plurality of nanoholes arranged at nodes of a first two-dimensional periodic grid, said first two-dimensional periodic grid having a first periodic spacing between said nanoholes; and
a second nanohole array comprising a plurality of nanoholes arranged at nodes of a second two-dimensional periodic grid, said second two-dimensional periodic grid having a second periodic spacing between said nanoholes different from said first periodic spacing;
wherein said optical element is powered by said electrical circuit and is operable to produce at least one optical authentication effect.

13. A method of authenticating a security document comprising an optical element embedded in a document substrate, wherein said optical element comprises:
a first nanohole array comprising a plurality of nanoholes arranged at nodes of a first two-dimensional periodic grid, said first two-dimensional periodic grid having a first periodic spacing between said nano nanoholes, said nanoholes comprising at least one dimension smaller than 400 nm; and
a second nanohole array comprising a plurality of nanoholes arranged at nodes of a second two-dimensional periodic grid, said second two-dimensional periodic grid having a second periodic spacing between said nanoholes different from said first periodic spacing, said nanoholes comprising at least one dimension smaller than 400 nm;
wherein said optical element comprises at least one of a metal film nanohole array and an electrically conductive film nanohole array; and
wherein said optical element is encoded to produce at least one encoded optical signal, the method comprising:
illuminating said encoded optical element with a light beam or laser light source emitting at least one defined wavelength of incident light;
detecting an encoded optical signal transmitted by said optical element in response to said incident light with an optoelectronic sensor;
analyzing at least one wavelength of said transmitted encoded optical signal detected by said sensor to produce a detected signal; and
comparing said detected signal with an authentication signal to authenticate the security document.

14. The method according to claim 13, comprising comparing said detected signal with an authentication signal by at least one of visual, electronic, optical, mechanical and biological inspection to authenticate the security document.

15. The method according to claim 13 further comprising filtering said encoded optical signal transmitted by said optical element using an optical filter or polarizer prior to said detecting.

16. A security document comprising at least one optical security feature, wherein said at least one optical security feature comprises at least first and second nanohole arrays in or disposed as a layer of said optical security feature, wherein:
said first nanohole array comprises a plurality of nanoholes arranged at nodes of a first two-dimensional periodic grid, said first two-dimensional periodic grid having a first periodic spacing between said nanoholes; and
said second nanohole array comprising a plurality of nanoholes arranged at nodes of a second two-dimensional periodic grid, said second two-dimensional periodic grid having a second periodic spacing between said nanoholes different from said first periodic spacing;
wherein said optical security feature comprises at least one of a metal film nanohole array and an electrically conductive film nanohole array; and
wherein each said nanohole array comprises nanoholes having at least one dimension smaller than 400 nm.

17. The security document according to claim 16, wherein said at least one optical security feature is selected from the list comprising: security threads, microprinting, holograms, optically variable effects and embossed and/or metallized foils.

18. The security document according to claim 16, wherein said first and second nanohole arrays of said optical security feature are arranged in a pattern of nanohole arrays to form an optical authentication effect.

19. The security document according to claim 16, wherein said optical security feature comprises said metal film nanohole array and said metal film nanohole array is optically opaque, further comprising a dielectric medium in contact with said metal film nanohole array.

20. The security document according to claim 16, wherein said nanoholes comprise a depth dimension extending perpendicular to at least one of said metal film and said electrically conductive film, and said nanoholes extend at least one of into or out of at least one of said metal film and said electrically conductive film.

21. The security document according to claim 16, wherein said at least first and second nanohole arrays are arranged in a pattern of nanohole arrays to define a pre-determined image, and wherein each of said at least first and second nanohole arrays defines an optical sub-unit of said pre-determined image.

22. The security document according to claim 21, wherein said optical security feature is embedded in or attached to a surface of a substrate material of said security document.

* * * * *